(12) United States Patent
Suzuki

(10) Patent No.: US 7,018,055 B2
(45) Date of Patent: Mar. 28, 2006

(54) IMAGE PROJECTING DEVICE AND IMAGE PROJECTING METHOD

(75) Inventor: Toru Suzuki, Chiba (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/878,009

(22) Filed: Jun. 29, 2004

(65) Prior Publication Data

US 2005/0024595 A1  Feb. 3, 2005

(30) Foreign Application Priority Data

Jul. 9, 2003   (JP)  ............................. P2003-272592
Jun. 4, 2004   (JP)  ............................. P2004-167474

(51) Int. Cl.
G03B 21/00   (2006.01)
G03B 21/26   (2006.01)
G03B 21/28   (2006.01)
H04N 3/02    (2006.01)

(52) U.S. Cl. ........................... 353/122; 353/28; 353/37; 353/99; 359/449; 382/103; 382/173; 382/206; 382/291; 348/195

(58) Field of Classification Search ................ 353/122, 353/28, 34, 37, 48, 66, 77, 79, 82, 94, 98, 353/99; 359/196, 201, 202, 204, 221, 449, 359/450; 348/195, 201; 382/106, 173, 206, 382/291
See application file for complete search history.

(56) References Cited

U.S. PATENT DOCUMENTS 6,002,505 A * 12/1999 Kraenert et al. ............ 359/196
6,193,375 B1 * 2/2001 Nagata et al. ................ 353/30

FOREIGN PATENT DOCUMENTS

JP    04-111585    4/1992
WO   WO 98/15127   4/1998

* cited by examiner

*Primary Examiner*—W. B. Perkey
*Assistant Examiner*—Rochelle Blackman
(74) *Attorney, Agent, or Firm*—Rader, Fishman & Grauer PLLC; Ronald P. Kananen

(57) ABSTRACT

The present invention provides an image projecting device for projecting projecting light corresponding to image information by projecting means. The image projecting device includes at least scanning monitoring means for monitoring entrance of an entering object into a projecting area on which the projecting light is projected. The scanning monitoring means monitors at least a part of outer edges of the projecting area on which the projecting light from the projecting means is projected.

12 Claims, 5 Drawing Sheets

IMAGE PROJECTING DEVICE AND IMAGE PROJECTING METHOD

BACKGROUND OF THE INVENTION

The present invention relates to an image projecting device and an image projecting method for displaying an image by projecting light corresponding to image information onto a screen or the like.

Recently, image projecting devices for projecting image information such as a video signal or the like onto a screen, or so-called projectors have been increasing in screen size. Less expensive products have been developed and going into not only office use but also household use. These devices have a plurality of high-luminance lamps or lasers incorporated therein for a larger screen and viewing even in a bright room.

With a device using a laser, laser light can enter the eye of a person and affect the eye. Thus, in order to ensure laser safety, international standards IEC-60825 precisely specify how to use devices using a laser according to laser output.

As for projectors that scan a laser and project the laser onto a screen, laser show guidance in the international standards IEC-60825-3 defines 3 m or more in an upward direction from a floor and 2.5 m or more in a horizontal direction in an area that an audience can enter.

In practice, however, there are not so many theaters that can project a laser at such a sufficient distance from an audience, and projection in other than theaters will be limited.

In order to conform to the specifications of the guidance in the international standards IEC-60825-3, Automatic Power Reduction (APR) is proposed as a method for preventing exposure of an audience to a laser. For example, a safety device of a projection type television receiver is proposed. The safety device of the television receiver includes detecting means for detecting entrance of a moving object into a projecting area from a projecting optical system to a screen. Output of a light source is controlled on the basis of a detection output from the detecting means to reduce or interrupt the light output (see Patent Document 1, for example).

Such a safety mechanism uses an infrared sensor as the detecting means. When simply using the sensor, it is not possible to detect a person moving at a long distance from a position of the sensor. Thus, this method lacks in suitability for embodiment as a method capable of detection.

For example, even for a sensor capable of detection at a short distance of about 5 m, detection at a long distance of 10 m or more is not easy.

[Patent Document 1]
Japanese Patent Laid-open No. Hei 4-111585

SUMMARY OF THE INVENTION

In view of the above problems, it is an object of the present invention to provide an image projecting device and an image projecting method having a safety function that can reliably detect entrance of an entering object such as a human body, a part of a human body, or the like even when projection is performed over a wider area.

In order to solve the above problems, according to the present invention, there is provided an image projecting device for projecting projecting light corresponding to image information by projecting means. The image projecting device includes at least scanning monitoring means for monitoring entrance of an entering object into a projecting area on which the projecting light is projected. The scanning monitoring means performs monitoring along at least a part of outer edges of the projecting area on which the projecting light from the projecting means is projected.

Also, in the above-described image projecting device according to the present invention, a part of a monitoring wave emitted from the scanning monitoring means is reflected for monitoring by reflecting means.

Further, in the above-described configuration according to the present invention, the reflecting means includes first reflecting means and second reflecting means, and the first reflecting means and the second reflecting means each include a first mirror and a second mirror.

Further, according to the present invention, there is provided an image projecting method for projecting light corresponding to image information. Entrance of an entering object is monitored by scanning a monitoring wave along at least a part of outer edges of a projecting area on which the projecting light is projected.

Further, in the above-described image projecting method according to the present invention, an entering object entering from at least two directions into the projecting area is monitored by reflecting at least a part of the monitoring wave.

With the above-described image projecting device according to the present invention, the scanning monitoring means detects entrance of an entering object, that is, a human body, a part of a human body or the like. A directional monitoring wave such for example as an infrared laser is used for monitoring, and monitoring is performed by scanning the monitoring wave along at least a part of the outer edges of the projecting area, for example along a lower edge of the projecting area, rather than over the whole of the projecting area. Thereby, when image information is projected over a wider projecting area, it is possible to reliably monitor an entering object from a relatively long distance of about 5 m or more, for example.

Further, in scanning the monitoring wave, the monitoring wave is scanned along a part of the outer edges of the projecting area, for example in a horizontal direction, and a part of the monitoring wave is reflected by the reflecting means to be scanned in a vertical direction, for example. It is thereby possible to simply and reliably monitor entrance of an entering object into the projecting area from two directions, for example from a direction of a position below the projecting area and a lateral direction.

Further, the first reflecting means and the second reflecting means each including a first mirror and a second mirror are used as the reflecting means. It is thereby possible to reliably monitor entrance from for example two directions into the projecting area with a simple structure.

Further, the image projecting method according to the present invention performs monitoring by scanning a monitoring wave along at least a part of the outer edges of the projecting area. Therefore, the projection of the monitoring wave onto the entire surface of the projecting area is not required, and monitoring at a relatively long distance can be performed reliably.

The image projecting device and the image projecting method according to the present invention perform monitoring along at least a part of the outer edges of the projecting area, as described above. Therefore, it is possible to reliably perform monitoring at a longer distance than conventional.

Further, the reflecting means in the present invention reflects at least a part of the monitoring wave, whereby entrance from two directions into the projecting area can be easily monitored.

Further, two pairs of mirrors, each pair including two mirrors, are used as the reflecting means. It is thereby possible to perform monitoring in a plurality of directions such as a downward direction and a lateral direction, for example, with a simple device configuration.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENT

An example of the best mode for carrying out the present invention will hereinafter be described with reference to the drawings. In the example below, description will be made of a case where the present invention is applied to a so-called laser projector type image projecting device using an RGB (red, green, and blue) laser as a projecting light source. However, it is needless to say that the present invention is not limited to the example below and is susceptible of various modifications and changes.

Figure 1:
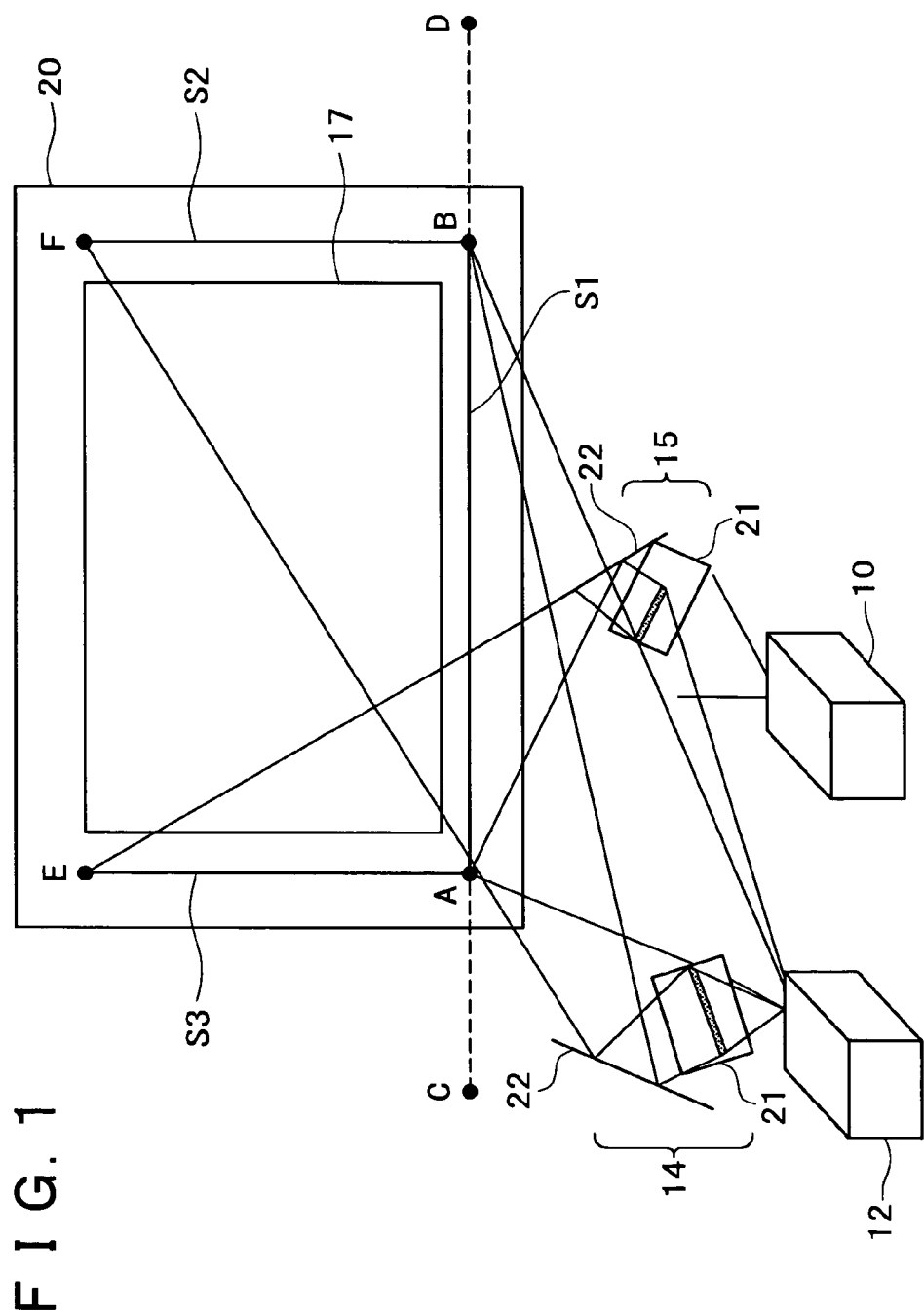
FIG. 1 is a schematic diagram of configuration of an example of an image projecting device according to the present invention.

As shown in FIG. 1, in this example, projecting light from a projecting light source 10 for projecting laser light is scanned over a projecting area 17 on a screen 20 to thereby project an image.

In the present invention, monitoring waves from scanning monitoring means 12 are scanned along at least a part of outer edges of the projecting area 17, or along a lower side as well as a right and a left side in a lateral direction as shown by solid lines S1, S2, and S3, respectively, in the example shown in FIG. 1 so that entrance of a human body or the like from this direction is monitored.

Incidentally, though not shown, when the scanning monitoring means 12 detects an entering object, the scanning monitoring means 12 transmits a detection signal to a control means, and then the control means transmits an instruction to reduce or interrupt the projecting light, for example, to the projecting means 10. It is thereby possible to avoid exposure of the laser light to the human body or the like.

In the example shown in FIG. 1, reflecting means reflects a part of the monitoring waves from the scanning monitoring means 12 to monitor, by scanning, entrance of a human body or the like from, for example, lateral directions of the left and the right of the projecting area 17.

First reflecting means 14 and second reflecting means 15 each including a first mirror and a second mirror are shown used as the reflecting means.

One concrete detection method usable for the scanning monitoring means 12 is a method of scanning a pulse laser. For example, as a laser scan range finder, LM291 (the name of a product from SICK) can be used. This device scans a pulse laser with a width of 5 ns and a peak output of about 20 W or more by a rotating mirror. The device is used to measure a time from emission of the pulse laser to reception of diffused and reflected light reflected and returned from an object. Thereby, the device measures a distance to the entering object on the basis of the time.

For example, letting a traveling speed of light be 300,000 km/s, a time required to receive light returned from an object at a distance of 10 m is calculated to be 10×2/300000000=66.7 ns.

Similarly, when a time from emission to reception is 100 ns, a distance to an entering object is calculated to be 15 m.

A scanning area of the range finder becomes a monitoring area to use such a pulse laser scan range finder as the scanning monitoring means. When a person enters this area, a time from emission by the scanning monitoring means to the returning of reflected return light is changed. That is, a distance to the reflecting object is changed from an initial value. It is possible to determine that a person or a part of a human body has entered to monitor this change in the distance.

Incidentally, it is needless to say that a distance of the monitoring scanned line scanned by the scanning monitoring means from the projecting area 17 is considered from a normal speed of movement of a human body or the like and a time for processing to, for example, reduce or interrupt projecting light from the projecting means 10 after detection of entrance.

Figure 2:
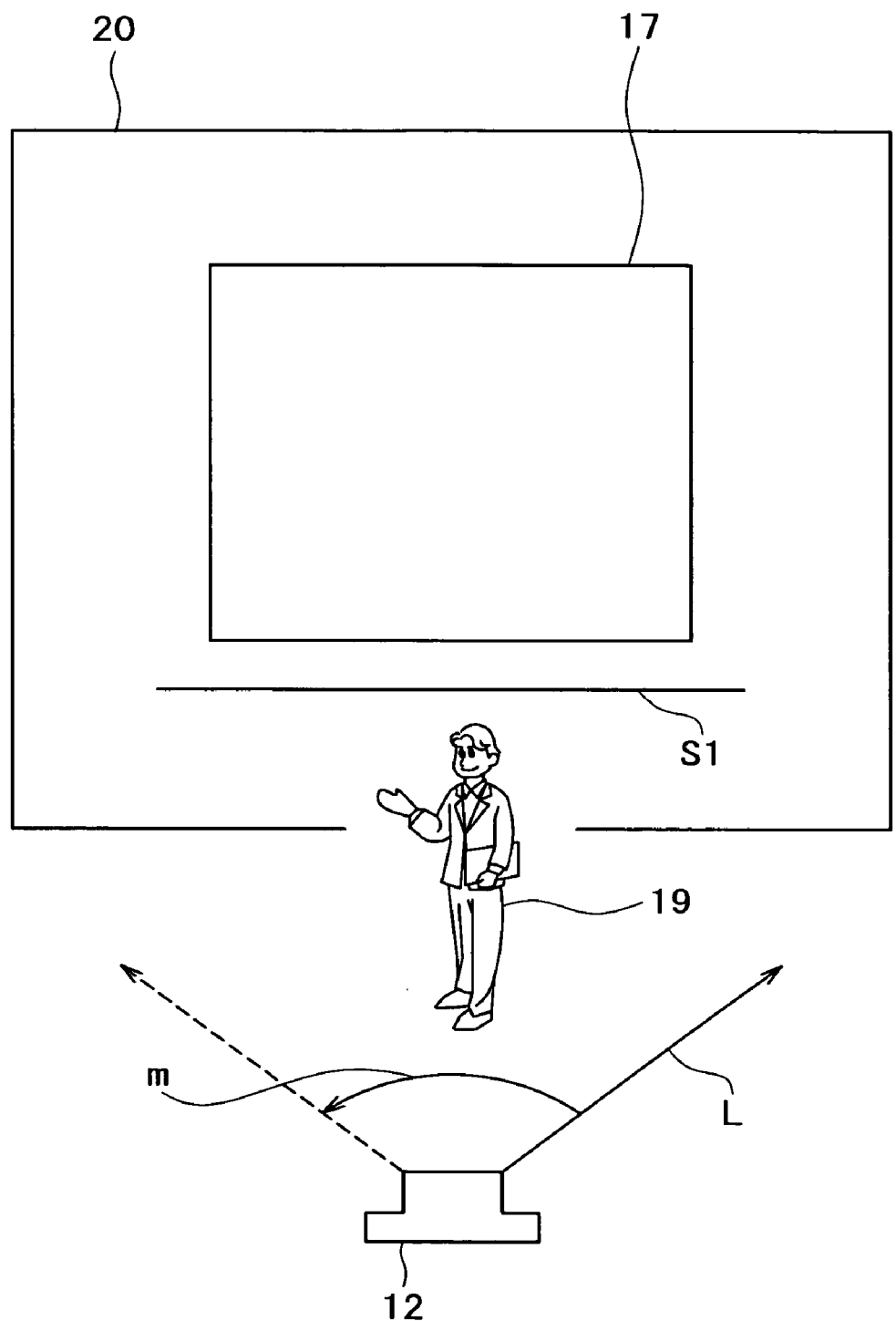
FIG. 2 is a diagram of assistance in explaining an example of an image projecting method according to the present invention.

Such a device is used as the scanning monitoring means according to the present invention. As shown schematically in FIG. 2, for example, a monitoring wave represented by an arrow L from the scanning monitoring means 12 is scanned by a rotating mirror or the like as shown by an arrow m. The wave is applied to a part, for example only a lower edge of the outer edges of the projecting area 17 in a horizontal direction in a form of a line as represented by a solid line S1. Thus, it is possible to detect an entering object 19 from a height of the scanned line or lower.

Figure 3:
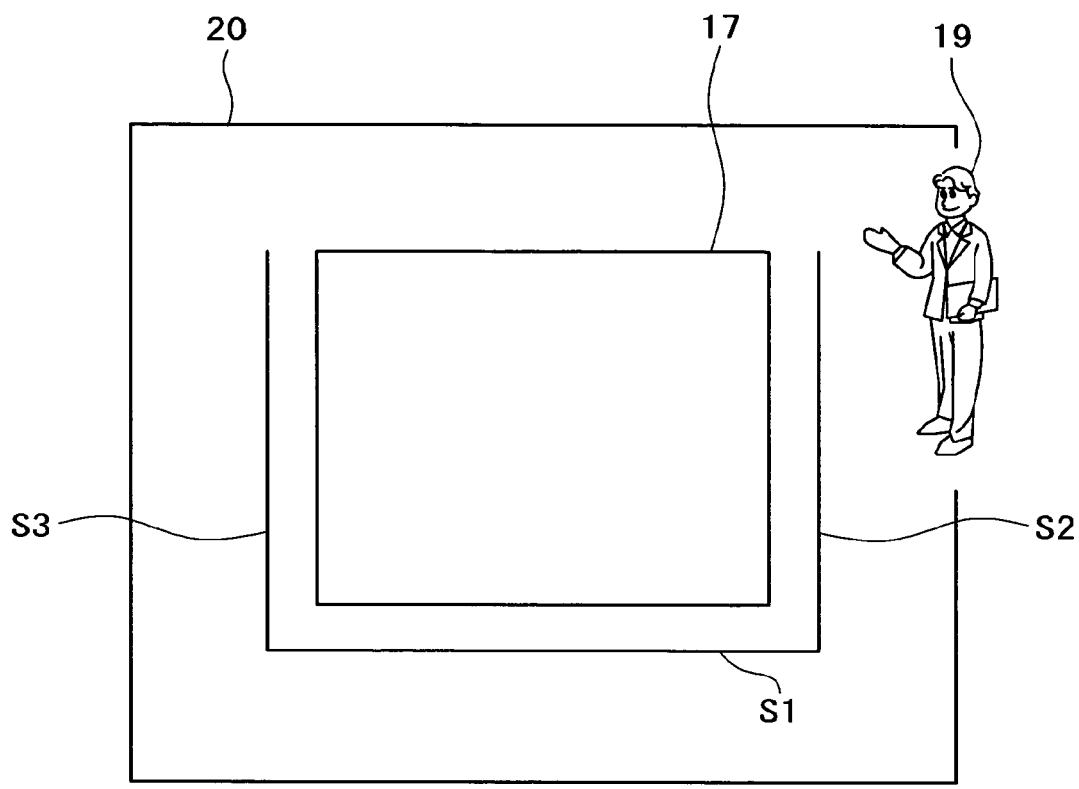
FIG. 3 is a diagram of assistance in explaining an example of an image projecting method according to the present invention.
Figure 3:
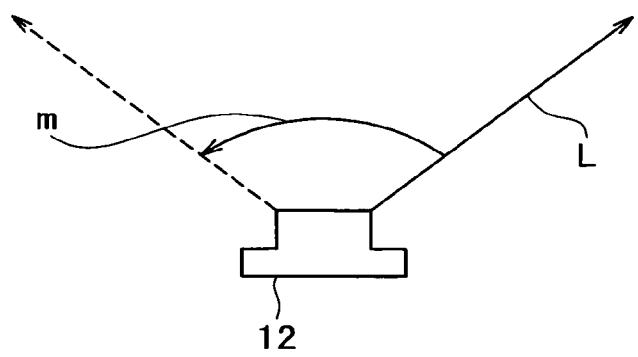

On the other hand, an entering object 19 from the lateral direction can be monitored as schematically shown in FIG. 3. Two pairs of mirrors with each pair including two mirrors as the reflecting means 14 and 15, as shown in FIG. 1, are used to vertically scan a part of the monitoring wave scanned in the form of a line along edge parts in the lateral direction of the outer edges of the projecting area 17 as shown by solid lines S2 and S3.

Incidentally, it is needless to say that a distance of the monitoring scanned line scanned by the scanning monitoring means from the projecting area 17 is considered from a normal speed of movement of a human body or the like and a time for processing to for example reduce or interrupt projecting light from the projecting means 10 after detection of entrance.

In the example of FIG. 1, scanning in the substantially horizontal direction is performed from point A to point B along the lower side of the outer edges of the projecting area 17. Scanning of the monitoring wave such as a laser or the like from the scanning monitoring means 12 is performed to point C and point D in a direction of extension to a left side and a right side, respectively, of the drawing of FIG. 1.

Then, the first reflecting means 14 reflects the scanned monitoring wave between points A and C to thereby scan the monitoring wave from point B to point F on the solid line S2 extending in a vertical direction and above point B.

Similarly, the second reflecting means 15 reflects the scanned monitoring wave between points B and D to thereby scan the monitoring wave from point A to point E on the solid line S3 extending in the vertical direction and above point A.

Thus, scanning in the vertical direction along the outer edges in the lateral direction of the projecting area 17 has an advantage of being able to surely detect entrance of an entering object from a higher position.

Monitoring means such as laser scan range finders or the like that vertically scan to detect an entering person from the lateral direction may be provided. However, since laser scan range finders are expensive, increase in the number of laser scan range finders becomes a burden in terms of cost. When the device is incorporated into the projector for the horizontal direction and the two vertical directions, a triple space is required, thus making it difficult to miniaturize the projector as a whole.

However, it is possible to reduce cost and miniaturize the projector to provide the reflecting means for scanning in the vertical direction using a part of the monitoring wave scanned in the horizontal direction.

Incidentally, since the laser scan range finder uses a rotating mirror for scanning, a scanning range depends on points in a direction of rotation of the mirror at which points a pulse laser is emitted. Therefore, it is possible to scan only a range of point C to point D, as described above. In scanning only below the projecting area 17, this range is limited to a range between point A and point B.

Figure 4:
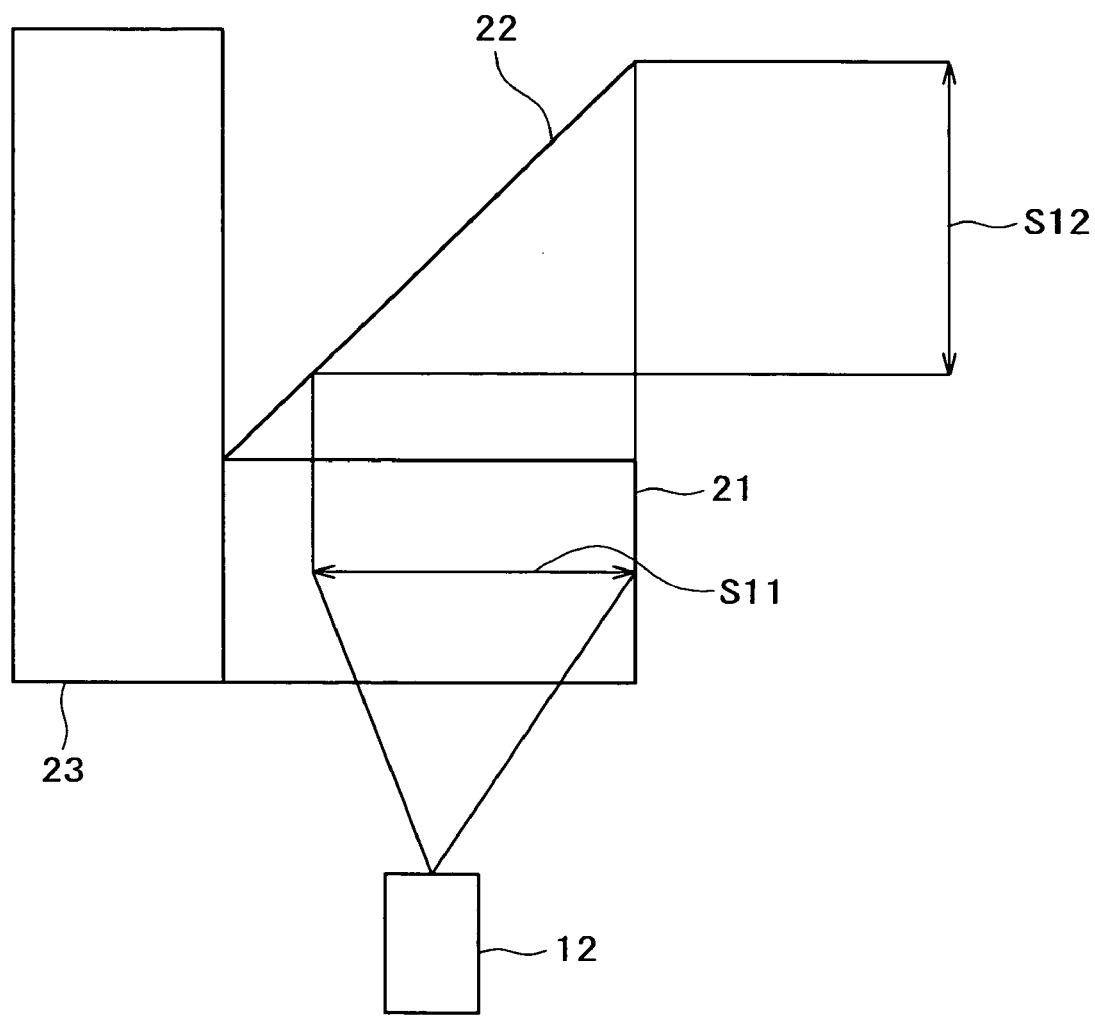
FIG. 4 is a schematic front view of an example of reflecting means of the image projecting device according to the present invention.
Figure 5:
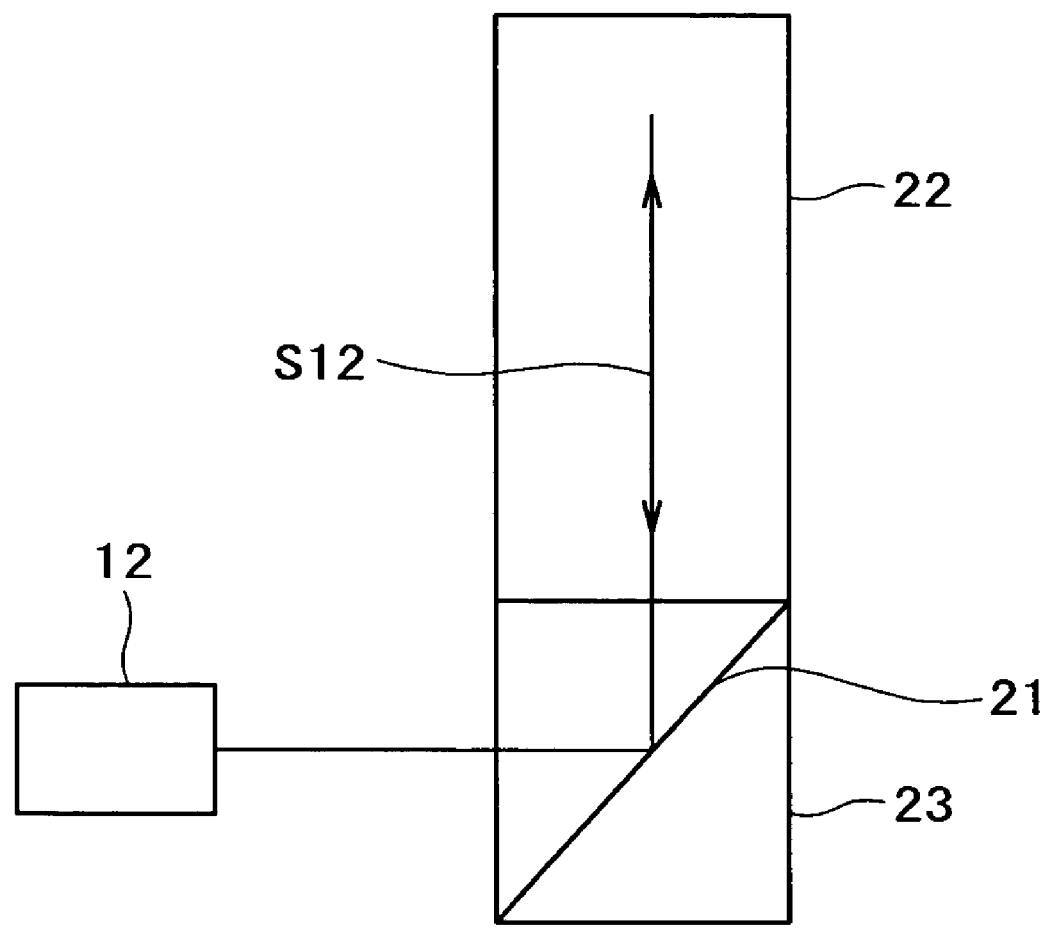
FIG. 5 is a schematic side view of an example of reflecting means of the image projecting device according to the present invention.

FIG. 4 and FIG. 5 are a front view and a side view, respectively, of a more detailed example of structure of the first mirror and the second mirror. The two mirrors form one set.

For example, the first mirror 21 is inclined 45 degrees with respect to a horizontal plane to change scanning in a direction of the horizontal plane as indicated by an arrow S11 to scanning in a direction of a vertical plane as indicated by an arrow S12. This scanning in the direction of the vertical plane is scanning in an upward direction, for example in a direction of a ceiling in a room. Therefore, scanning over the screen 20 cannot be performed.

Accordingly, changing the monitoring wave in the direction of the ceiling to a direction of the screen 20 by the second mirror 22 enables scanning in a substantially vertical direction along the edge parts in the lateral direction of the outer edges of the screen 20. The second mirror 22 is easy to use practically when the second mirror 22 has an angle of 45 degrees with reference to the horizontal plane and has a normal perpendicular to that of the first mirror 21. The angle of inclination of the second mirror 22 can be changed to adjust height of scanning in the vertical direction.

As described above, according to the present invention, even when the distance between the monitoring means and the screen is increased, an entering object can be monitored with high accuracy by scanning a monitoring wave.

In particular, the reflecting means reflects a part of the scanned monitoring wave to vertically scan the monitoring wave along a part, for example edge parts in the lateral direction of the outer edges of the projecting area. Thereby an inconvenience of providing a plurality of scanning monitoring means in monitoring entrance into the projecting area from two directions can be avoided to thus reduce cost and miniaturize the device. Also, as compared with a case where only horizontal scanning is performed below an outer edge of the projecting area, entrance of an entering object from a high position in the lateral direction of the projecting area, for example, can be monitored more reliably.

Incidentally, it is needless to say that the present invention is not limited to the foregoing embodiment and is susceptible of various modifications and changes; for example, the present invention is applicable to other projector type image projecting devices using high-luminance lamps, and a rotating mirror can be used as the reflecting means.

It is also needless to say that the shape of the projecting area is not limited to a rectangular shape as in the foregoing example, and that the present invention is applicable to cases where edges of the projecting area are curved, as for example where a part of the projecting area is bent along the screen.

What is claimed is:

1. An image projecting device, comprising:
a projecting light source for projecting projected light corresponding to image information by projecting means on a projecting area for receiving said projected light, said projecting area defining outer edges;
scanning monitoring means emitting a monitoring wave for monitoring entrance of an entering object into said projecting area on which said projecting light is projected;
said scanning monitoring means performing monitoring along at least a part of said outer edges of the projecting area on which said projecting light from said projecting means is projected,
wherein at least a part of a monitoring wave emitted from said scanning monitoring means is reflected for monitoring by reflecting means, wherein said reflecting means comprises first reflecting means and second reflecting means; and said first reflecting means and said second reflecting means each comprise a first mirror and a second mirror.

2. The image projecting device as claimed in claim 1, wherein said scanning monitoring wave scans a lower edge of the outer edges of the projecting area in a horizontal direction to detect an entering object.

3. The image projecting device as claimed in claim 2, wherein said scanning monitoring wave scans vertical edges of the outer edges of the projecting area in a vertical direction to detect an entering object.

4. The image projecting device as claimed in claim 2, wherein scanning monitoring save scans vertical edges of the outer edges of the projecting area in a vertical direction to detect an entering object.

5. The image projecting device as set forth in claim 1, wherein said projecting area is defined at least by points A, B, C, D, E and F defining a rectangular area wherein scanning is performed between point A and point B in a substantially horizontal direction along the lower side of the outer edges of the projecting area, and along an extension of said horizontal direction between points A and C and between points B and D, wherein the first reflecting means reflects the scanning monitoring wave between points A and C to thereby scan the monitoring wave from point B to point F along a vertical edge of said projecting area, and wherein the second reflecting means reflects the scanning monitoring wave between points A and E on another vertical edge of said projecting area.

6. the image projecting device as set forth in claim 5, wherein said first and said second reflecting means are arranged relative to said scanning monitoring means and said projecting area to achieve the stated scanning functions.

7. The image projecting device as set forth in claim 1, wherein said projecting area is on a screen.

8. The image projecting device as set forth in claim 1, wherein said projecting area is defined at least by points A, B, C, D, E and F defining a rectangular area wherein scanning is performed between point A and point B in a substantially horizontal direction along line S1 which is the lower side of the outer edges of the projecting area, and between point and along an extension of said horizontal direction between points A and C and between points B and D therealong, wherein the first reflecting means reflects the scanning monitoring wave between points A and C to thereby scan the monitoring wave from point B to point F along a vertical edge of said projecting area along line S2, and wherein the second reflecting means reflects the scanning monitoring wave between points A and E on another vertical edge of said projecting area along line S3.

9. the image projecting device as set forth in claim 8, wherein said first and said second reflecting means are arranged relative to said scanning monitoring means and said projecting area to achieve the stated scanning functions.

10. An image projecting device, comprising:

a source of projected light;

a projecting area for receiving projected light, said projecting area defined by a substantially horizontal line S1, and a pair of spaced substantially vertical lines S2 and S3 respectively;

scanning monitoring means emitting a monitoring wave for monitoring entrance of an entering object into said projecting area on which said projected light is projected, said scanning monitoring means performing monitoring along at least a part of said outer edges of the projecting area;

reflecting means for reflecting at least a part of said monitoring wave emitted from said scanning monitoring means, said reflecting means having a first reflecting means and a second reflecting means, each comprising a first mirror and a second mirror, wherein said scanning monitoring means and said reflecting means cooperate to scan at least a portion of said edges of said projecting area.

11. The image projecting device as claimed in claim 10, wherein said scanning monitoring wave scans a lower edge of the outer edges of the projecting area in a horizontal direction along the line S1 to detect an entering object.

12. The image projecting device as set forth in claim 10, wherein said projecting area is on a screen.

* * * * *